United States Statutory Invention Registration [19]

[11] Reg. Number: H884

Gottlieb et al. [43] Published: Feb. 5, 1991

[54] METHOD AND APPARATUS FOR INCREASING THE ANGULAR APERTURE OF AN ACOUSTO-OPTIC DEVICE

[75] Inventors: Milton S. Gottlieb, Churchill; Nathan T. Melamed, Pittsburgh, both of Pa.

[73] Assignee: The United States of America as represented by the Secretary of the Air Force, Washington, D.C.

[21] Appl. No.: 469,801

[22] Filed: Jan. 22, 1990

Related U.S. Application Data

[63] Continuation of Ser. No. 240,293, Aug. 6, 1988, abandoned.

[51] Int. Cl.[5] ..... G02F 1/11
[52] U.S. Cl. ..... 350/358
[58] Field of Search ..... 350/358

[56] References Cited

U.S. PATENT DOCUMENTS 4,575,186 3/1986 Gottlieb et al. ..... 350/358
4,798,449 1/1989 Vichon et al. ..... 350/358

FOREIGN PATENT DOCUMENTS 0099649 8/1979 Japan ..... 350/358
0079411 6/1980 Japan ..... 350/358

OTHER PUBLICATIONS

G. Chao, *Focusing and Scanning of Acoustic Beams with Fresnel Zone Plates*, pp. 140–143, Naval Research Laboratory, Washington, D.C.

I. C. Chang, *Analysis of the Noncollinear Acousto-Optic Filter*, pp. 617–618, Applied Technology, Sunnyvale, CA 12/11/75.

S. T. K. Nieh et al., *Aperture-Bandwidth, Characteristics of the Acousto-Optic Filter*, pp. 672–676, Journal of the Optical Society of America, May 1972.

*Primary Examiner*—Linda J. Wallace
*Attorney, Agent, or Firm*—Bobby D. Scearce; Donald J. Singer

[57] ABSTRACT

A method and apparatus for increasing the angular aperture of an acousto-optic device employing an acoustic zone plate positioned on an acoustic input face of an acousto-optic device. The angular spread of acoustic energy within the acousto-optic device is increased over the angular spread obtainable with a single transducer of the same length; thus providing an increased angular aperture for the resultant acousto-optic device.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FOR INCREASING THE ANGULAR APERTURE OF AN ACOUSTO-OPTIC DEVICE

This application is a continuation of application Ser. No. 07/240,293, filed Aug. 6, 1988, now abandoned.

CROSS REFERENCE TO RELATED APPLICATION

This application is related to U.S. patent application, Ser. No. 07/156,043, now U.S. Pat. No. 4,886,346, entitled: Method and Apparatus for Improving the Angular Aperture of an ADOLF, and assigned to the assignee of the subject application. This related application is hereby incorporated by reference.

BACKGROUND OF THE INVENTION

The present invention relates to acousto-optic devices, and more particularly to a method and apparatus for increasing the angular aperture of an acousto-optic device. An important characteristic of any acousto-optic device is the angle of incidence through which light may be applied to the acousto-optic device without degrading the resolution of the acousto-optic device. This angle of incidence is known as the angular aperture of an acousto-optic device. A large angular aperture or acceptance angle is desirable since this results in an increased light gathering capability of the acousto-optic device.

The maximum aperture of an acousto-optic device is determined by the allowable phase mismatch between the incident optical light and the acoustic waves, beyond which the diffraction efficiency of the acousto-optic device drops to under one-half the value for the exact phase matching (i.e., exact Bragg angle matching).

The design parameters of an acousto-optic device such as an acousto-optic tunable filter (hereinafter "AOTF") include the angle of incident light with respect to the crystal axis of the material comprising acousto-optic device, $\theta_i$, and the interaction length of the incident light and acoustic waves travelling within the crystal, L. Generally, the interaction length L is approximately the same as the length of a transducer launching acoustic waves into the crystal.

FIG. 1 illustrates the relationships of these parameters. In FIG. 1, reference symbol $\Delta\theta_i$ denotes the angular aperture of the angular aperture $\Delta\theta_i$ to L is $$\theta_i = 2\left[\frac{\lambda_o}{L\Delta n}\right]^{\frac{1}{2}} \quad (1)$$

wherein $\lambda_o$ is the wavelength of light travelling within the AOTF, and $\Delta n$ is the birefringence of the crystal material comprising the AOTF. For example, if the crystal material comprises thallium arsenic selenide ($Tl_3AsSe_3$) (hereinafter "TAS"), the birefringence is about 0.18. From equation 1, it is seen that the angular aperture can be made large by making L small. However, when L is small, a high RF drive power is required to operate the acousto-optic device so as to achieve an acceptable diffraction efficiency. This is because both the diffraction efficiency of an acousto-optic device and the drive power are related to the length L of the acoustic transducer. Diffraction efficiency is a well known quantity and is discussed in I. C. CHANG, "Acousto-Optic Devices and Applications," IEEE Trans. on Sonics and Ultrasonics, Vol. SU-23 No. 1, pp. 2–21, January 1976, and in Gottlieb et al., *Electro Optic and Acoustic Optic Scanning and Deflection*, Marcel, Dekker, 1985, at, for example, page 110, Equations 6.24 and 6.25.

Generally, for a given drive power density, as the length of the acoustic transducer L increases, the diffraction efficiency improves. Therefore, it is undesirable to make L small, because the power drive requirements therefor are great. In short, the smaller the length L, the greater the needed power density. As a result, with small transducer lengths the transducer tends to overheat. For example, if 5 watts are needed for an acousto-optic device, applying this power to a large transducer provides a low power density. But, when applying it to a small transducer the power density may be too high for the transducer. Therefore, making L small limits the amount of power that can be applied to the transducer. As a result, the angular aperture of an acousto-optic device cannot be greatly improved by making the length of the transducer L too small to support the required power.

SUMMARY OF THE INVENTION

It is an object of the present invention to provide a method and apparatus for increasing the angular aperture of an acousto-optic device.

It is another object of the present invention to provide an acousto-optic device having a large acceptance angle and high diffraction efficiency.

To achieve the above and other objects, an acousto-optic device according to the present invention comprises a crystal having an optic axis, an optic input face and an acoustic input face; and a plurality of spaced apart acoustic transducers positioned on the acoustic input face so that light incident to the optic input face at various angles with respect to the optic axis is diffracted to an output beam.

The present invention also provides a method of increasing the angular aperture of an acousto-optic device comprising a crystal having an optic axis, an optic input face and an acoustic input face with a plurality of spaced apart acoustic transducers positioned thereon, the method includes the steps of launching acoustic waves into the crystal from the plurality of spaced apart acoustic transducers, and applying light to the optic input face with a predetermined angular aperture about the optic axis.

DESCRIPTION OF THE PREFERRED EMBODIMENT

Figure 1:
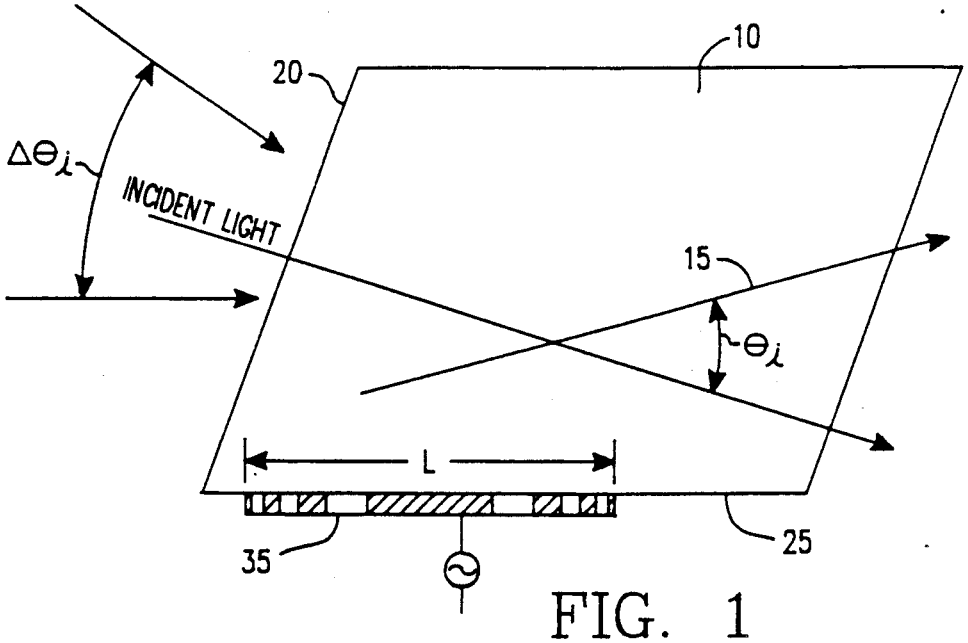
FIG. 1 is a schematic, side view of an acousto-optic device.
Figure 2:
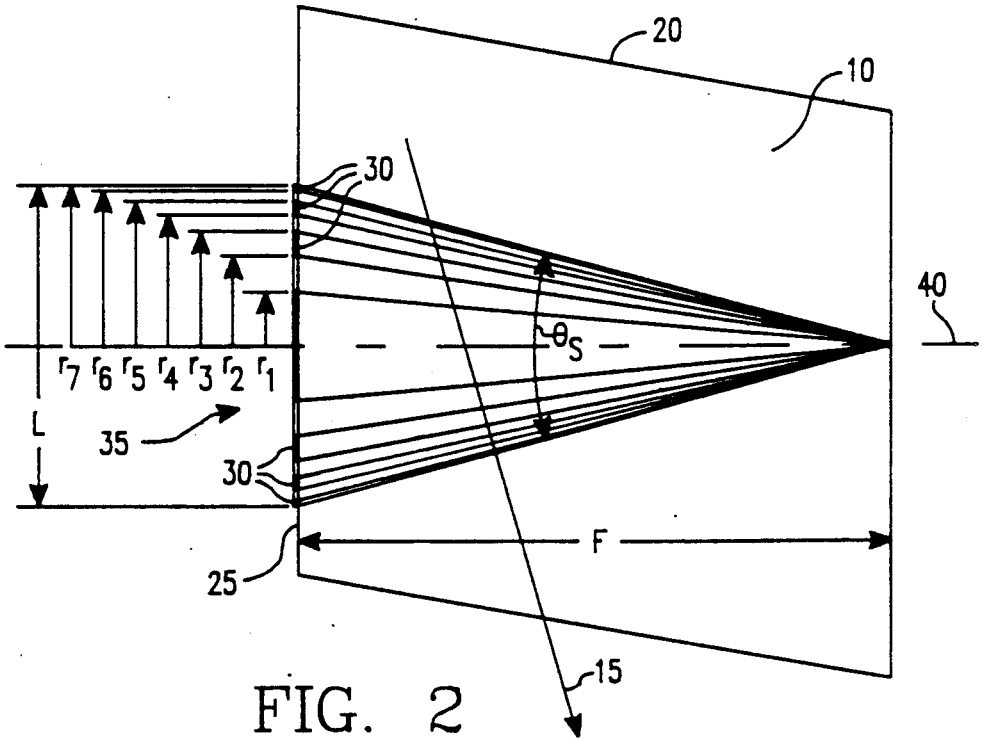
FIG. 2 is a schematic, top view of an acousto-optic device according to the present invention.

The present invention provides a acousto-optic device having an acousto-optic transducer in the form of an acoustic zone plate. Referring to FIG. 2, an acousto-optic device according to the present invention includes a crystal 10 having an optic axis 15. The crystal 10 has an optic input face 20 and an acoustic input face 25.

A plurality of spaced apart acoustic transducers 30 are positioned on the acoustic input face 25, and together comprise an acoustic zone plate 35. The design of the acoustic zone plate 35 depends upon the wavelength of the acoustic energy generated by the transducers 30, the length L of the zone plate 35, and the focal length of the zone plate 35. The velocity v of the acoustic energy within the crystal 10 is related to the frequency f and wavelength Λ of the acoustic energy by the expression $$v = f\Lambda \tag{2}$$

The dimensions of a zone plate are determined by the following equation $$r_n^2 = nvF/f \tag{3}$$

In equation 3, $r_n$ is the spacing to the $n^{th}$ zone of the zone plate 35, n is the zone number and v is the velocity of acoustic energy within the crystal 10, and F is the length from the input face 25 to a point where the acoustic energy is focused. Referring to FIG. 2, each $r_n$ defines the distance from the center line 40 to the boundary of the $n^{th}$ zone. The spacing between zones varies in proportion to the square root of the zone number n. The spacing can, of course, be scaled up or down as desired to vary the value of F. For example, if the center transducer element 30 has a width of 5 mm, then the spacing $r_2$ to the beginning of the second zone would be $5\sqrt{2}$.

The angular spread $\Lambda_s$ of the acoustic field shown in FIG. 2 is defined by the following $$\theta_s = 2\tan^{-1)}\left[\frac{L}{2F}\right] \tag{4}$$

The angular aperture $\Delta\theta_i$ is essentially determined by the angular spread $\theta_s$, and thus by the expression shown in equation 4. This is because acoustic energy is available for exact phase matching with incident light everywhere within the angular spread defined by equation 4.

The increased angular aperture of the acousto-optic device causes a decrease in the resolution of the device. However, employing a zone plate in accordance with the present invention enables the acoustic beam spread (i.e., the divergence in the FIG. 2 example) to be varied in a way that is independent of the overall length L of the zone plate 35. In other words, for a given zone plate length L and acoustic energy wavelength Λ, angular spread of the acoustic energy can be changed by varying the focal length F; that is, by changing the number of zones within the zone plate length L. For example, if the first zone spacing $r_1$ is made smaller, then there will be more zones within the given length L, but L remains the same. The angular spread $\theta_s$ is thus changed without the necessity of changing the length L of the acoustic zone plate 35.

One application of the present invention is an AOTF positioned within the illuminator system of a microscope. In the illuminator system, high resolution is not required, but high light throughput is an necessity. One such AOTF built by the inventors of the subject application comprises an AOTF having an angular aperture $\theta_i$ of 10°, an acoustic zone plate length L of 9 mm and an acoustic frequency of 40 Mhz. A $TeO_2$ crystal was used as the crystal 10.

Figure 3A:
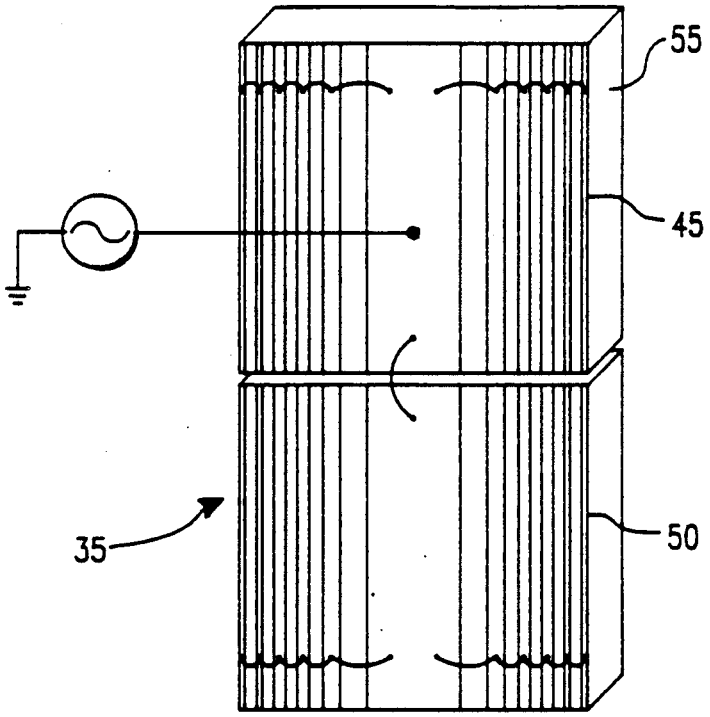
FIGS. 3A and 3B are respectively a plan view and an end view of a acoustic transducer according to the present invention.
Figure 3B:
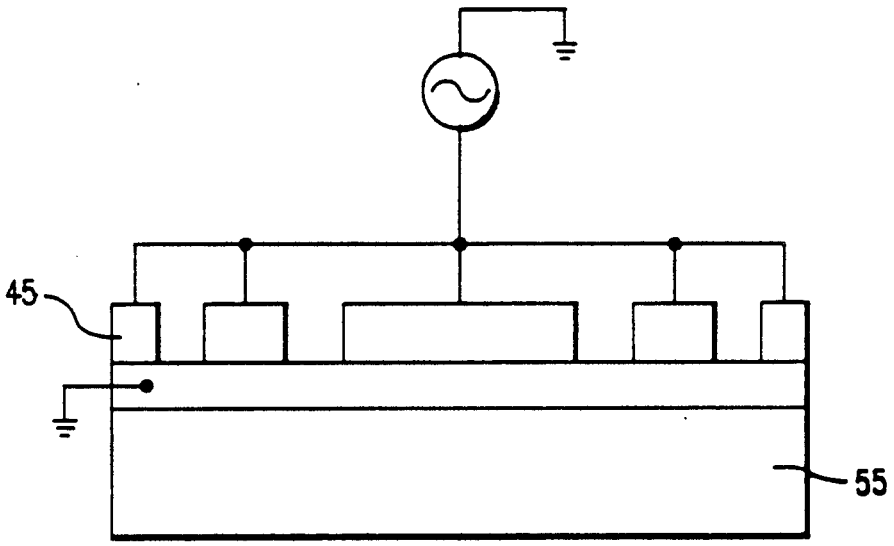

A zone plate 35 can be implemented in a variety of ways. One such way is schematically illustrated in FIGS. 3A and 3B. In FIG. 3A, upper and lower electrode patterns (45 and 50) are deposited on an acoustic transducer 55. The upper and lower electrode pair (45, 50) are electrically connected as schematically represented in FIGS. 3A and 3B. It is not necessary to use separate electrodes (e.g. upper and lower electrode patterns (45, 50)), and instead, a single electrode pattern can be used. Use of two electrode patterns as shown in FIG. 3A provides an increase in the impedance of the zone plate 35. Formation of electrode patterns such as illustrated in FIG. 3A results in the formation of a plurality of spaced apart acoustic transducers. An alternative to providing an electrode pattern on an acoustic transducer 55 is to actually construct a series of transducers, and to position the transducers on the acoustic input face 25 in accordance with the spacing define by equation 3.

Because an ideal zone plate includes an infinite number of transducer elements, practical embodiments of a transducer must comprise a limited number of zones. Therefore, a zone plate 35 as illustrated in FIG. 2 is termed a truncated zone plate. One effect of limiting the number of zones in a zone plate is to reduce the effective angular spread $\theta_s$ of the acoustic waves within the crystal 10. To compensate for the reduced effective angular spread, it is desireable to make the length L of the zone plate 35 as large as possible. Increasing the zone plate length also increases the diffraction efficiency of the acousto-optic device.

With the example AOTF noted above, it is generally desirable to operate such an AOTF over a spectral range for incident light. To do so, the frequency of the acoustic energy applied to the AOTF must be varied over a comparable range in order to ensure phase matching of the incident light with the acoustic waves travelling within the crystal 10. However, as seen from equations 3 and 4 above, the angular spread of the acoustic beam varies with frequency. Thus, in selecting the design of a zone plate 35, the degree of frequency variation of the acoustic energy must be considered. In short, the effect of a variable acoustic frequency on the angular spread $\theta_s$ depends upon the application of the acousto-optic device. For example, where a broad band excitation source is desired, it is possible for the AOTF resolution to be decreased over that which would be obtained with a single element transducer of the same size, in order to provide a greater optical throughput. In addition, the optical resolution of an AOTF, Δλ will tend to be constant in wavelength rather than constant in wave number.

As seen from the above, the present invention provides a method and apparatus of increasing the angular aperture of acousto-optic devices. By employing an acoustic zone plate, the angular spread of acoustic energy within an acousto-optic device is much larger than that obtainable from a simple acoustic transducer of the same size. Because of the larger angular spread of the acoustic energy, the resulting acousto-optic device has a wider angular aperture over which incident light can be efficiency diffracted. The present invention also permits the use of larger transducer lengths which enables lower drive powers to be used while still maintaining a high diffraction efficiency.

We claim:

1. An acousto-optic device comprising:

(a) a crystal having an optic axis, an optic input face and an acoustic input face; and (b) a plurality of spaced apart acoustic transducers positioned on the acoustic input face such that light incident to the optic input face at various angles with respect to said optic axis is diffracted along said optic axis as a corresponding output light beam in response to acoustic input to said transducers.

2. An acousto-optic device according to claim 1, wherein said spaced apart acoustic transducers comprise an acoustic zone plate.

3. An acousto-optic device according to claim 2, wherein said crystal comprises an optically birefringent material.

4. A method of increasing the angular aperture of an acousto-optic device comprising a crystal having an optic axis, an optic input face and an acoustic input face and a plurality of acoustic transducers positioned thereon, said method comprising the steps of:

launching acoustic waves into the crystal from the plurality of spaced apart acoustic transducers; and applying light to the optic input face within a predetermined angular aperture about the optic axis.

* * * * *